Nov. 24, 1964 R. R. BOWDLE 3,158,844

DATA PROCESSING SYSTEM

Filed Sept. 14, 1959 4 Sheets-Sheet 1

Raymond R. Bowdle
*INVENTOR.*
*BY.*
Robert H. Fraser
*ATTORNEY.*

Raymond R. Bowdle
*INVENTOR.*
*BY.*
Robert H. Lowe
*ATTORNEY.*

Raymond R. Bowdle,
*INVENTOR.*
BY [signature]
*ATTORNEY.*

Nov. 24, 1964 R. R. BOWDLE 3,158,844

DATA PROCESSING SYSTEM

Filed Sept. 14, 1959 4 Sheets-Sheet 4

Raymond R. Bowdle
*INVENTOR.*
*BY.*
[signature]
*ATTORNEY.*

3,158,844
DATA PROCESSING SYSTEM
Raymond R. Bowdle, Los Altos, Calif., assignor to International Business Machines Corporation, New York, N.Y., a corporation of New York
Filed Sept. 14, 1959, Ser. No. 839,964
15 Claims. (Cl. 340—174.1)

This invention relates to integrated electronic data process systems, and more particularly to a new and improved system and control for achieving maximum effective use of a high speed, high capacity information storage unit.

Many different types of information storage devices or memories are known and used in modern electronic data processing machinery. One type of information storage in particularly widespread use is the random access memory of extremely high capacity. These units are particularly suitable for use in systems in which a great deal of information is maintained available for continuous processing. Many commercial establishments, for example, must maintain continual records of the status of a great many items, but need make changes in individual entries only at relatively slow rates. The random access, high capacity memory is especially suited for such applications, because any entry may readily be changed or made available.

One particularly attractive type of high capacity random access memory stores information at high density on a number of recording tracks disposed in two or three dimensions. Because of the spatial disposition of the tracks, access to the stored information may be had by more than one record transducer, so that the memory can be coupled to more than one data processor. A highly efficient form of this type of memory uses a number of parallel discs mounted on a common shaft, with each of the discs having a number of tracks for high density digital storage. In the usual case, a magnetizable recording surface stores digital information in a binary code. It may readily be visualized that a number of magnetic transducer units may be located about the periphery of such a storage system, and that each may be positioned at specific addresses independently of the others. This feature thus permits utilization of the tremendous storage capacity of the multidisc memory. A different data processor can be associated with each of the different transducers, and each of the data processors can record, reproduce or revise information independently of the others.

An integrated data processing system of the type described above permits each of the data processing units to be independently operable while using the same memory storage device. Each data processing unit may initiate and terminate operations at a selected address at essentially random times, and without being programmed in synchronization with the other units. It is necessary, however, to maintain the information stored in the memory in distinct and orderly form. Transfer of data between one data processing unit and the memory therefore should be completed before another data transfer operation begins at the same address. Accordingly, when one of the data processing units seeks an address at which a different data processing unit is then operating, the existing operation should be performed to continue without interference until it is complete. If two units seek the same address simultaneously, only one should operate upon the stored information and the other should automatically be required to wait its turn.

These problems of synchronizing and coordinating the operation of the different units may be accomplished by separate programming routines for the data processing units or by coupling the data processors to each other so as to effect a comparison before a given operation is begun. These techniques, however, materially reduce the independence of operation of each of the data processing units, and in addition require the use of disproportionate amounts of equipment for considerable periods of time.

It is therefore an object of the present invention to provide an improved system for effectively utilizing the capabilities of a high capacity random access memory.

It is another object of the present invention to provide an integrated system employing a single information storage device for permitting simultaneous use of the device by a number of independent data processors.

It is yet another object of the present invention to provide an improved data processing system using an information storage consisting of a number of discs mounted on a common axis and cooperatively operating with a number of data processing units each having a separate transducer associated with the information storage.

It is another object of the present invention to provide a control system which permits more than one data processor to operate with the same information storage, and also operate with other information storages to which other data processors have access.

Yet another object of the invention is to provide an integrated system by which more than one transducer may operate autonomously with a single multiaccess memory device.

It is a further object of the present invention to provide an improved control circuit capable of operating with a number of data processing units and a single information storage device so as to prevent conflict between the data processing units in transferring data to and from the data storage device.

It is a further object of the present invention to provide a system for synchronizing and controlling the operation of a number of individual data processing units each having an associated transducer operating with a common storage device, to permit the data processing units to use information contained at specific addresses in accordance with a time priority, and to establish a priority when the same address is held simultaneously by more than one data processing unit.

These and other features of the present invention are provided by an arrangement in accordance with the invention which utilizes a number of data processor units in conjunction with a high capacity random access memory. Each of the data processing units has an associated separately addressed transducer and each data processing unit operates under signals from a control circuit which establishes the priority in which units seeking the same address can operate at that address. The priority is on a time basis except when units seek the same address simultaneously, in which event the priority is granted in accordance with a predetermined order.

Specifically, an arrangement in accordance with the invention may in one form utilize a multiple disc random access memory having the discs arranged in parallel on a common axis. Each of the discs is provided with a number of concentric magnetic tracks. Separately positioned transducer units, one for each of the data processors, are employed with the memory device. The data processing units are arranged to provide address information to control the positioning of the associated transducers, and the transducers in turn provide positioning complete signals when they have located the address desired. With these signals and units there is also employed a control circuit which responds to the address signals and to the positioning complete signals to eliminate possible conflicts in the use of a given address and to provide signals which indicate the availability of a transducer to the associated processing units.

In the control circuit, each new address is compared separately to the other then existing addresses. Where the addresses are unlike, these comparisons provide closed signal paths which operate selector circuits. The selector circuits are arranged in groups corresponding to the separate data processing units, and when all of the selector circuits in a group are operated following a positioning complete signal from the associated transducer, an indication that the track which was sought is available is provided to the data processing unit. As the data processing units seek new addresses, therefore, this control circuit establishes a time priority for the use of any one address which is sought by more than one unit.

Where more than one of the data processing units seeks the same address at the same time, the result of the comparison of the addresses sought causes an interlock condition in which neither of the associated selector circuits can be operated without more being done. For this situation, an interlock control circuit is provided which is arranged to detect the interlock condition and to compel operation of a predetermined one of the interlock selector circuits. This action therefore establishes a fixed priority for the data processing units. Consequently, as the data processing units continuously seek new addresses without regard to the operation of the other units, the control circuits insure that the occurrence of an address which is then in use or simultaneously sought by another unit will only result in an orderly data transfer or transfer at the address, first by one unit and then by another.

A better understanding of the present invention may be had from a reading of the following detailed description and an inspection of the drawings, in which.

*System Arrangement*

Figures 1, 2:
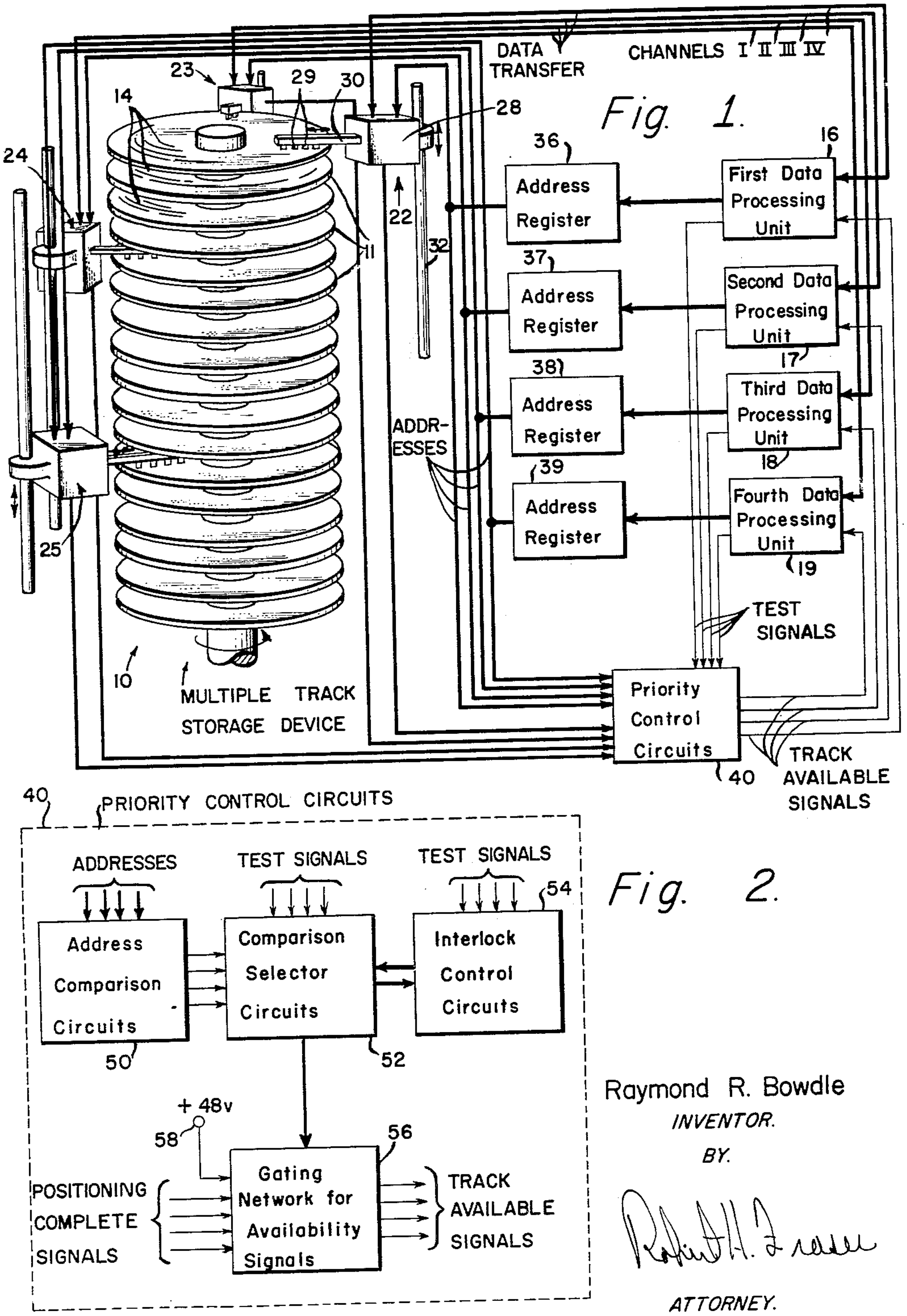
FIG. 1 is a simplified diagrammatic representation of an arrangement in accordance with the present invention which utilizes a single high capacity random access memory, a number of data processing units, and priority control circuits.
FIG. 2 is a block diagram of the principal operating units within the priority control circuits of FIG. 1, and including address comparison circuits, comparison selector circuits, interlock control circuits and a gating network.

The principal operative units of a system for providing maximum utilization of a high capacity information storage are shown in FIG. 1 in simplified form. The information storage 10 may be the type of high capacity random access memory which utilizes a number of recording discs 11 mounted parallel to each other on a common central shaft 12. The discs 11 each include magnetic tracks 14 concentrically placed about the center shaft 12. In FIG. 1 these tracks 14 are indicated only generally but it will be understood that they are densely packed in the radial direction on each of the discs 11. The arrangement is so disposed as to provide high density recording in a peripheral direction around the tracks as well as closely packed separate tracks 14. The spacing between the discs 11 need only be such as to permit access to magnetic transducer units, so that although the storage 10 occupies a relatively small volume, the data recorded within the volume can be of the order of millions of bits of information. The shaft 12 and all of the discs 11 rotate with an extremely high rate of speed and access can be gained to information at any particular location very quickly, so that the entire unit 10 may properly be termed a random access memory.

The capacity of the information storage 10 is such that where individual entries are not of extreme length or required to undergo extensive processing, the storage unit 10 may serve more than one data processing unit. Thus in the present example there may be four data processing units 16–19, respectively, each operating to transfer data to and from the information storage 10. The data processing units 16–19 may also be considered to be a part of informations channels I, II, III and IV, respectively.

Each of the data processing units 16–19 provides address information for the selection of locations within the information storage 10. When coupled to operate at selected address locations, the data processing units 16–19 may record information, reproduce information, and selectively modify the information located at that address. In the usual application, each of the data processing units 16–19 proceeds through successive operations in which information from an external source causes the data processing units 16–19 to seek a selected address, modify the information contained thereat in accordance with the input information, and then to seek another new address determined by new input information, and so on. The data processing units 16–19 thus provide and receive information on what may be called data transfer lines. Although for simplicity only single lines have been shown for the address and data transfer conductors, it will be recognized that the information will usually be in binary form on parallel lines, so that the single heavy connections may be understood to designate multiple lines in parallel. Nevertheless, the address and data transfer information might be in serial or serial-parallel form. The data processing units 16–19 also provide separate "test" signals, in order to control coordination of the various circuits. The test signals are in the form of voltage levels provided during a data transfer operation by a data processing unit 16–19. In accordance with the present invention, the data processing units 16–19 begin data transfer operations after the provision of address information only upon the receipt of signals which indicate that the storage tracks are available for operation. These "track available signals" are provided in a manner described in more detail below.

Each of the data processing units 16–19 is coupled to a different one of first through fourth transducer units 22–25 respectively. The transducer units 22–25 provide the operative coupling between the data processors 16–19 and the magnetic tracks 14 on the discs 11. Accordingly, they may also be referred to as the access units for selecting specific addresses in the information storage 10. To provide simultaneous use of the information storage 10 in the present arrangement, each of the transducer units 22–25 is positioned at a different peripheral location with respect to the discs 11. Thus, each transducer unit 22–25 may move parallel to the column of discs 11 in order to select the discs 11, and also radially with respect to the discs 11 in order to select a track 14 without interference with the other ones of the transducer units 22–25.

Inasmuch as each of the transducer units 22–25 is substantially alike, only the first unit 22 need be described in detail. As is shown in general form in FIG. 1, the first transducer unit 22 includes a control mechanism 28 which is coupled to receive address information. The control mechanism 28 may include servos for providing precise positioning in the vertical and radial directions with respect to the discs 11. A number of magnetic heads 29, shown only generally, are mounted on an access arm 30 which is moved into a radial position by the control mechanism 28 when a disc 11 has been selected. For change of vertical position, the control mechanism 28 and the access arm 30 are shown as being movable with respect to the vertical shaft 32, the control mechanism 28 moving along the shaft 32 vertically to select a particular disc 11. If desired, however, the transducer unit 22 may alternatively have a different access arm for each disc, so that selection of the disc may be made electrically and a mechanical movement used only in the radial direction.

When the transducer units 22–25 select a given location, they are arranged to provide a "positioning complete" signal to indicate that they have arrived at the selected address. This signal is provided as soon as the positioning is complete but is not utilized at the data processing unit until further determinations have been made.

The system also includes address registers 36–39 respectively, each associated with a different one of the data processing units 16–19 respectively. The address registers 36–39 each maintain the address provided by the associated data processing unit 16, 17, 18 or 19 until it is superseded by the next address which is to be utilized. The address registers 36–39 may, of course, be part of the associated data processing units 16–19, but the function of these registers 36–39 may be more readily visualized when they are depicted as separate units. Addresses are thus supplied to the transducer units 22–25 from the address registers 36–39, and not directly from the data processing units 16–19.

Each of the transducer units 22–25 and each of the address registers 36–39 is coupled to priority control circuits 40 which provide "track available" signals to the data processing units 16–19. Inasmuch as there may be more than one address in a selected track, the track available signal means that a particular desired part of a recording track is free. The priority control circuits 40 provide the function of awarding priority to given addresses on the basis of time or, if an address is sought simultaneously by more than one unit, to select one of the units for operation. The priority control circuits 40 receive test signals from the data processing units 16–19, as is described in more detail below.

The priority control circuits 40 of FIG. 1 supply a number of interrelated functions, and utilize circuit elements which are arranged in an integrated manner with each other and with the remaining functional units of FIG. 1. The principal operative units in the priority control circuits 40, however, are shown in block diagram form in FIG. 2. As may there be seen, the priority control circuits 40 include address comparison circuits 50 which are coupled to comparison selector circuits 52. The address comparison circuits 50 are responsive to the addresses from the channels I, II, III, IV from the data processing units 16–19 (of FIG. 1), and provide outputs to the comparison selector circuits 52, which are also responsive to the test signals. Interlock control circuits 54 are intercoupled with the comparison circuits 52, and also operated under control of the test signals. The comparison selector circuits 52 and the interlock control circuits 54 control a gating network 56 which provides the track available signals constituting the final output from the priority control circuits 40. The gating network 56 is coupled to a positive D.C. supply, here a +48 volt supply 58, and is also responsive to the positioning complete signals from the transducer units of FIG. 1.

In each of the figures of the drawings, heavy lines have been utilized to indicate the presence of a number of parallel or related lines. The designations which have been used for the various units 50, 52, 54 and 56 correspond generally to the functions provided by these units. Thus the address comparison circuits 50 make various comparisons between the addresses sought in the various channels, the comparison selector circuits 52 check the results of these comparisons, the interlock control circuits 54 operate to prevent an interlocked inoperative condition in the selector circuits 52, and the gating network 56 gates out signals when certain selected relationships exist.

Figure 3:
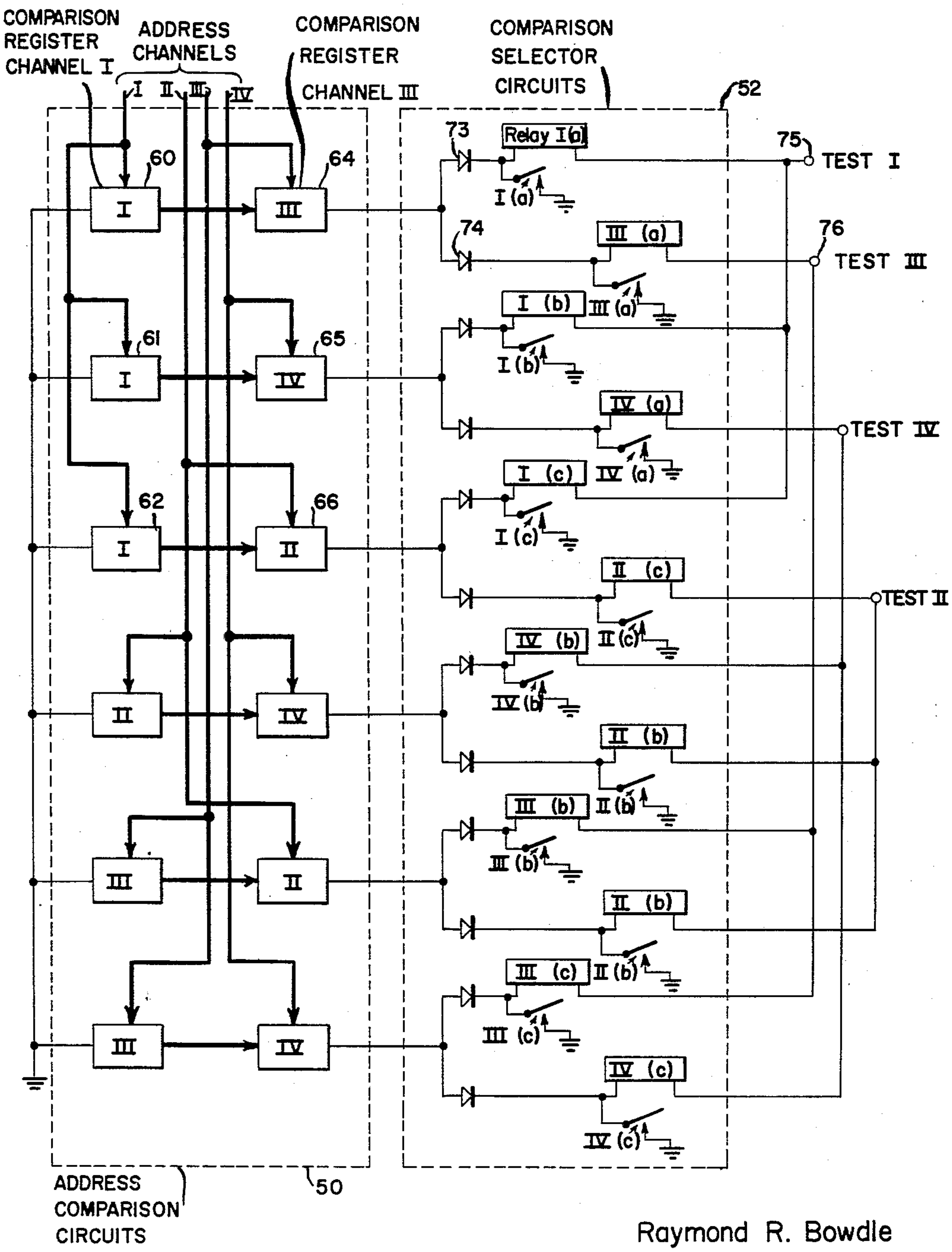
FIG. 3 is a block diagram and simplified schematic representation of address and comparison circuits which may be utilized in the arrangement of FIG. 2.

Reference may be made to FIG. 3 for an understanding of the arrangement and some of the details of the address comparison circuits 50 and the comparison selector circuits 52 of FIG. 2. The address comparison circuits 50 include circuits for comparing the addresses provided by each of the data processing units. Address inputs provided in each of the channels I–IV are used to set up corresponding individual addresses in different ones of a group of intercoupled comparison registers. Different comparison registers for each channel, such as the three registers 60, 61 and 62 for channel I, are disposed in series pairs with individual and different comparison registers for each of the other channels. Thus, for comparison of channel I to channel III, a comparison register 60 for channel I is coupled in series with a channel III comparison register 64. Similarly, other channel I comparison registers 61 and 62 are coupled in series with individual comparison registers 65 and 66 for channel IV and channel II respectively. The remaining comparison registers provide similar paired groupings to establish each possible unique pairing of one address with another. The intercoupled series groupings of the addresses from the different channels I–IV are accordingly referred to as address comparison pairs.

It will be recognized that other arrangements could alternatively be used in the address comparison circuits 50 inasmuch as the primary function which is performed is the comparison of addresses from the various address registers. Similar results could be obtained by the use of a logical gating network alone or by the use of a single comparison register for each channel and gating networks providing the pairings between registers. The presently described arrangement is, however, particularly suitable for performing the necessary functions in a manner which simplifies the associated circuitry.

Each address comparison pair operates to provide a closed circuit path only when different addresses are provided to the comparison registers in the pair. Thus, if the channel I address and the channel III address are the same, the associated comparison registers 60 and 64 provide an open circuit path, whereas if the addresses are different, a closed circuit path is provided. This operation, and the manner in which the comparison registers of FIG. 3 may be mechanized, is illustrated in more detail in FIG. 4, to which reference may now be made. Inasmuch as each of the address comparison pairs is basically the same, only one address comparison pair need be shown and discussed.

The two comparison registers 60 and 64 for channel I and channel III respectively are illustrated as operated with addresses consisting of three parallel binary digits. Three-digit addresses are used only for purposes of illustration, inasmuch as a high capacity memory would require the use of more address information than is possible with three binary digits. The extension of the example, however, is merely routine.

Each address operates relays within the comparison registers 60 and 64, and the relays set up the count. Thus, for the lowest order binary digits for channel I, a single-pole double-throw relay 68 has its coil coupled to receive the low order binary digit signals. A like relay 69 in the register 64 for channel III is similarly coupled at the low order digit position. The contact point of the two relays 68 and 69 are, in a sense, cross-coupled. Thus the "0" contact of the channel I relay 68 is coupled to the "1" contact of the other relay 69. Similarly, there is a connection between the "1" contact of the relay 68 and the "0" contact of the paired relay. The arm of the relay 68 for channel I is coupled to ground, while the arm of the matched relay 69 in channel III constitutes an external terminal which may be used for testing for the existence of the closed circuit condition. Thus a series connection is made to ground through the two relays 68 and 69 whenever the digital counts set up in the relays are unlike. In a similar fashion, for each binary digit of the address a pair of relays are cross-coupled in series to provide like couplings to ground when the addresses are different. For an address of "110" in channel I and an address of "100" in channel III, the dissimilarity in the binary digit of value two provides a series coupling to ground. The state of this circuit is tested by inputs applied to the associated part of the selector circuits. Hence, only selector relay I(*a*) is shown, in simplified form, coupled in series with the comparison registers 60, 64. Test signals in channel I applied to relay I(*a*) find a completed circuit path to ground whenever the addresses in the comparison registers 60, 64 are unequal at any one, or more than one, bit.

Thus the various interconnecting address comparison pairs of FIG. 3 provide single lines which create open or closed circuit paths to establish each unique comparison relationship. As the addresses which are provided to the registers are changed the closed or open circuit paths are changed automatically to correspond.

The comparison selector circuit 52, referring again to FIG. 3, operates to choose various switching conditions which represent the states of the address comparison pair in the address comparison circuits 50. Referring again to FIG. 3, for each single line from an address comparison pair there is a pair of selector relays coupled in parallel. Each selector relay has been given a numerical and alphabetic designation which distinguishes both the channel in which the relay is used and the different relays within the channels. Thus there are three selector relays for channel I and they are identified as the I(*a*), I(*b*) and I(*c*) relays respectively. Similarly, for channel III, the selector relays are designated as relays III(*a*), III(*b*) and III(*c*) respectively. The contact mechanisms which are associated with the relay coils are indicated in the drawing are normally open or normally closed. Normally open contacts are given designations similar to those used for the relay (e.g., I(*a*)), and normally closed contacts are given a primed designation (e.g., I(*a*)').

One specific example only of the couplings of the selector relays is discussed, it being understood that the couplings of all of the relays in the comparison selector circuits 52 of FIG. 3 follow the same pattern. Thus, for the address comparison pair for channel I and channel III in the address comparison circuits 50, there are parallel selector relays I(*a*) and III(a). Each of these relays is coupled through a different isolating diode 73, 74 to the associated address comparison pair, and each is also coupled to an associated test signal input 75 or 76. The diodes 73 and 74 effectively isolate each one of the selector relay circuits I(*a*) and III(*a*) from the other, but permit both to be coupled in series to the associated address comparison pair. The test signal inputs 75 and 76 are responsive to the data processors of FIG. 1, a separate signal being provided for each of channels I and III.

Each of the selector relays, such as relays I(*a*) and III(*a*) (FIG. 3) is assumed to have a "pick" or latching coil and also a self-holding coil, with the pick coil being used to operate the relay and the "hold" coil thereafter being used to maintain the relay in the operated state until a release signal is provided. Such latching and hold arrangements are well known and widely used in relay switching systems. Each relay also includes both normally open and normally closed contacts, with the normally open contacts (I*a*) and III(*a*) coupling the relays I(*a*) and III(*a*) to ground when these relays have been operated.

Thus, when an address comparison pair in the address comparison circuits 50 provides a closed path to ground, the application of one of the test signals I–IV to a selector relay coupled to that address comparison pair causes the relay to be operated, and then to be held closed by the associated coupling to ground. The test signals are positive signals in this arrangement, so that the diodes 73 and 74 are coupled into the circuit so as to provide the desired isolation. Specifically, the anodes of the diodes are coupled to the positive signals, and the cathodes are coupled to ground according to the convention adopted here.

By relating each of the comparison selector circuits to the associated address comparison pair, it may be seen that a different relay is used for each channel address which is compared. Thus, for the comparison of channel I with channel IV, the corresponding selector relays are I(*b*) and IV(*a*). Similarly, for the comparison of channel I with channel II, the selector relays are I(*c*) and II(*c*). For each unique pair compared in the address comparison circuit 50 there is a corresponding unique pair of relays in the selector circuits 52, and all possible comparison pairs are provided.

The interlock control circuits 54 of FIG. 2 are principally defined by various circuit couplings between the elements of the comparison selector relays. Each circuit coupling in the interlock control circuit is used to control closure of a given selector relay in the comparison selector circuits 52 in response to specific conditions therein. The manner in which this is accomplished through the use of additional control relays is shown in more detail in FIG. 6, to which reference may now be made. For convenience and clarity, each of the control relays has been given a designation similar to that of the relay which it controls. Thus the control relay for relay I(*a*) is designated as control relay *k*I(*a*).

Each of the control relays is coupled to an associated selector relay in such a manner that operation of the control relay induces operation of the selector relay. For channel I, three control relays, *k*I(*a*), *k*I(*b*) and *k*I(*c*) are used. The coupling of the pick and hold coils and the contacts of one control relay, such as *k*I(*a*), illustrates the manner in which the remaining control relays are arranged. The control relay *k*I(*a*) has its pick coil 77 coupled in series with the normally closed contacts I(*a*)' and III(*a*)', the series circuit being responsive to test signals in channel I. The hold coil 78 of the control relay *k*I(*a*) is responsive, through normally open contact *k*I(*a*), to test signals in channel I. With both contacts I(*a*)' and III(*a*)' in their normal, closed positions, a test signal in channel I operates the pick coil 77 of control relay *k*I(*a*), which closes normally open contact *k*I(*a*) to thereafter energize hold coil 78 to maintain control relay *k*I(*a*) closed. This in turn causes a normally open contact *k*I(*a*) to couple the test signals in channel I to the hold coil 79 for the selector relay I(*a*). In effect, this sequence establishes that when neither selector relay I(*a*) nor selector relay III(*a*) is closed, test signals in channel I cause the control relay *k*I(*a*) to force closure of the selector relay I(*a*) by operation of the hold coil 79.

Selector relay I(*b*) is responsive to channels I and IV, and selector relay I(*c*) is responsive to the combination of channels I and II. Therefore, as with the combination of channels I and II, each of these relays I(*b*) or I(*c*) has an associated control relay, *k*I(*b*) or *k*I(*c*) respectively, coupled similarly to the arrangement of the control relay *k*I(*a*). Thus the three control relays exercise supervisory functions and are grouped according to the separate pairings of channel I with each of the other channels.

The remaining control relays are paired off with separate parallel groupings of selector relays and are used to control one of the selector relays. For the combination of selector relays which coupled channels II and III to check the results of a comparison, for example, a control relay *k*I(*a*) is used to give priority to selector relay II(*a*). In like manner, for the combination of channels II and IV, a control relay *k*II(*b*) operates selector relay II(*b*), while for the combination of channels III and IV a control relay *k*III(*c*) induces operation of selector relay III(*c*).

Figure 6:
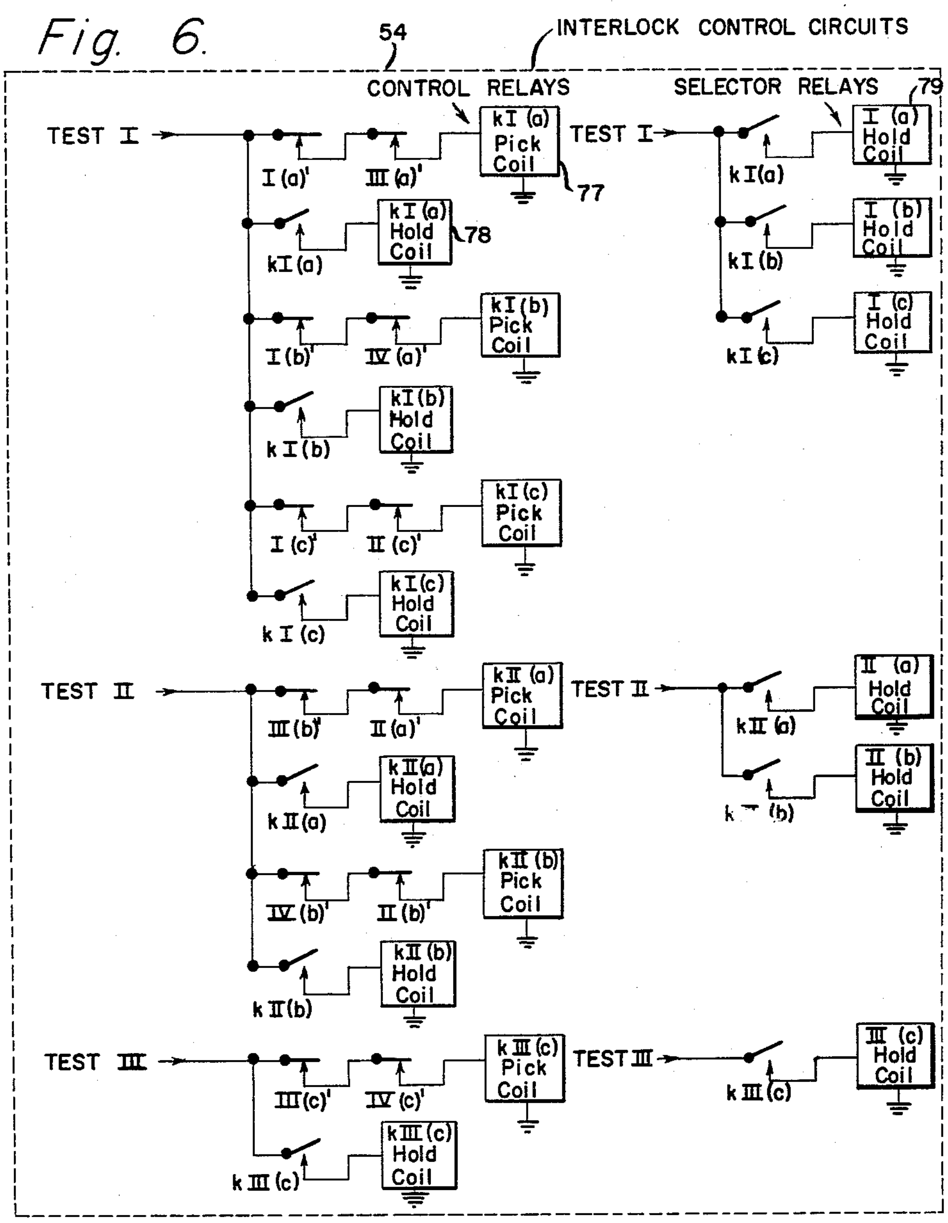
FIG. 6 is a simplified schematic diagram of interlock control circuits which may be utilized in the correspondingly identified unit of FIG. 2.

Briefly, then, the function of the various control relays is to check for a certain condition of the associated address comparison pair, this being the interlock condition, and to respond to this interlock condition by inducing operation of a predetermined one of the selector relays for that address comparison pair. There are 12 selector relays, for the four channels which are used, and thus there are six pairings for which six different relays are to be given priority. The circuitry shown in FIG. 6 is the means by which these priorities are established. As with the comparison selector circuits 52 of FIG. 2, the interlock control circuits 54 are returned to their normal conditions of operation following termination of the test signal, which signifies completion of the processing of the data at a selected address.

Figure 5:
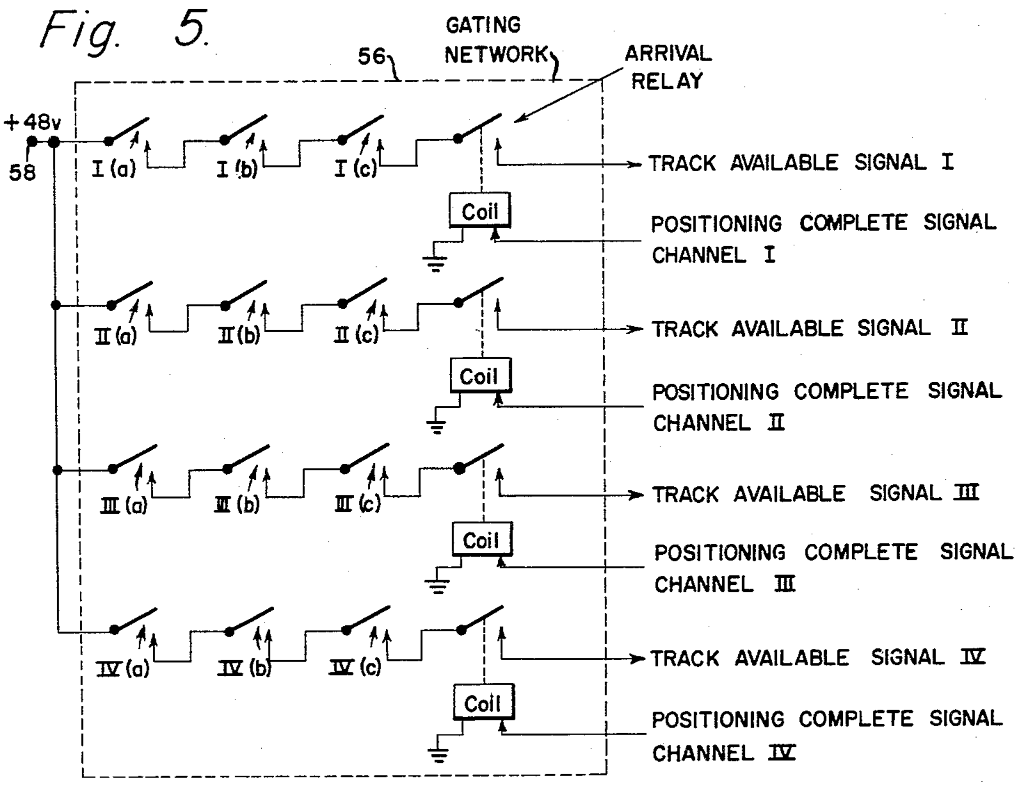
FIG. 5 is a simplified schematic representation of one form of gating network which may be utilized in the correspondingly identified unit of FIG. 2.

The gating network 56 which provides the signals indicating the availability of a transducer unit for data transfer is shown in detail in FIG. 5. The gating network 56 consists of four different channels, each corresponding to information channels I–IV of the associated data processing units. Each channel includes a series coupling of normally open contacts of the three selector relays for the channel, together with a relay which is actuated upon the provision of positioning complete signals. For example, for the first channel, the series consists of the contacts for the selector relays I($a$), I($b$), and I($c$) and a normally open contact for an arrival relay 81 which is actuated and held upon the application of positioning complete signals. The series is coupled to a positive 48 volt supply 58, so that when all of the contacts are closed the circuit provides the desired "track available" signal to the associated data processing unit as shown in FIG. 1.

The track available signals are provided for each of the other channels II–IV by like separate series couplings between the positive 48 volt supply 58 and the three normally opened contacts of the selector relays for that channel, in conjunction with the normally opened contact of the arrival relay responsive to the positioning complete signal. Each network thus detects the condition in which there is coincident energization of the selector relays for a specific channel, which means that the address for that channel is unlike the addresses for each of the other channels. The activation of the arrival relay in addition is required, because this determines when a transducer unit has been completely positioned at a desired address and is thus available for a data transfer operation.

*Operation*

The operation of systems and circuits in accordance with the present invention may best be understood by first briefly reviewing the manner in which the principal operative units function. With reference to FIGS. 1 and 2, it should be understood that the various data processing units 16–19 are operating continuously, except when awaiting the availability of an address at a track. Thus, as a data transfer operation at a given address is completed, the data processing unit 16, 17, 18 or 19 provides a new address to the corresponding one of the address registers 36–39. As the other data processing units continue their data transfer operations with their associated transducers, therefore, the newly addressed one of the transducers 22–25 seeks and finds the address desired. Upon arrival at the desired track, and completion of positioning, the transducer 22, 23, 24 or 23 provides a positioning complete signal back to the priority control circuits 40.

The priority control circuits 40, which are coupled to receive concurrently the addresses from all four of the data processing units 16–19, then determine whether the transducer is free to operate upon the newly addressed track or part of a track, and provide the track available signal back to the associated data processor 16–19. The address registers 36–39 provide the function of making the addresses continuously available for comparison in the priority control circuits.

Figure 4:
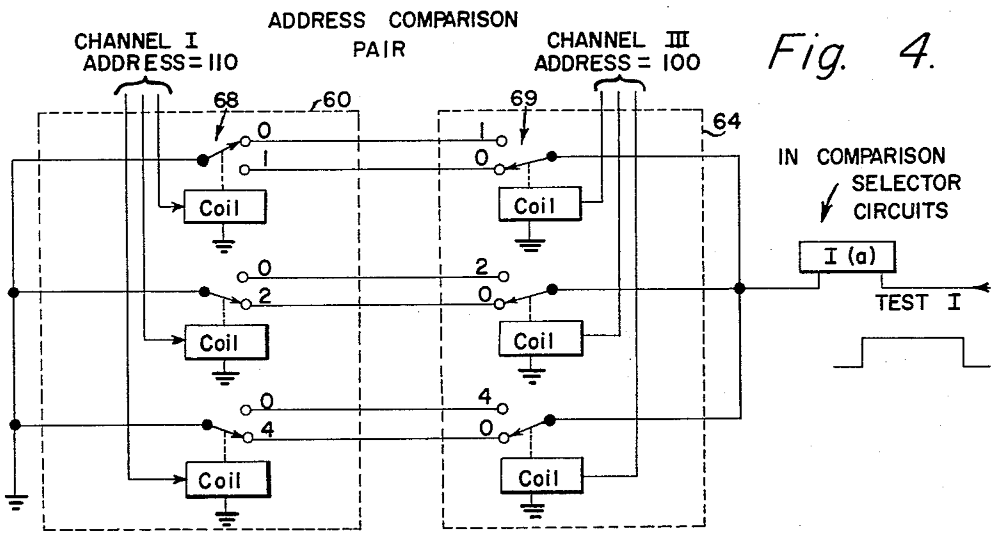
FIG. 4 is a detailed simplified schematic representation of comparator circuits which may be used in the address comparison circuits shown in FIG. 3.

Now, referring to FIGS. 3, 4 and 5, it will be understood how the system operates to test for freedom from conflicting addresses, and to assign priorities on a sequential basis when like addresses are sought by more than one unit. In the address comparison circuits 50 (FIG. 3) are shown the various comparison registers which establish the series pairings for the different possible combinations of addresses from channels I–IV. Thus, for channel I, addresses from the address register 36 of FIG. 1 set up corresponding counts in comparison registers 60, 61 and 62. The three comparisons possible, with channels III, IV and II, respectively, are established by the series couplings to other comparison registers 64, 65 and 66. As described above in conjunction with FIG. 4, the comparison registers in each pair, such as 60 and 64, provide a series coupling to ground when the desired addresses are in any way unlike. When test signals are applied from the data processors of FIG. 1 to the comparison selector circuits 52, therefore, the selector relays therein are operated wherever they are coupled to a grounded closed circuit path in the address comparison circuit. If the data processing units operate for a relatively long period of time without seeking the same address, the comparison selector circuits are effectively coupled to closed circuit paths during the entire time. These couplings are broken only momentarily when a data transfer operation has been completed. Then the data processing unit 16, 17, 18 or 19 in FIG. 1 terminates the test signal, a new address is provided, and the next test signal for that channel actuates the selector relays to check and record the results of the three address comparisons and to reestablish the closed circuit to ground.

For each full comparison the comparison selector circuits 52 cooperate with the gating network 56 of FIGS. 2 and 5. All three of the selector relays, such as I($a$), I($b$) and I($c$) for a given channel, such a channel I, must be operated concurrently. In addition, the arrival relay for that channel must also be operated by a positioning complete signal for the associated transducer unit. The various selector relays, such as I($a$), I($b$) and I($c$) indicate that the address desired for the channel is unlike the address then being provided for the other channels. Each of these relays is self-locking, as is the arrival relay, so that the track available signal is provided as a D.C. level from the positive 48 volt source 58.

In addition to providing automatic gating of the results of the comparisons, the comparison selector circuit 52 and the gating network 56 are so arranged that when a newly sought address is like an address then being used, the data processing units have priority to the address on the basis of time. Referring specifically to FIG. 3, the first operated relay in each parallel pair of selector relays coupled to an address comparison pair is kept closed by its own self-hold circuit until the test signal terminates at the completion of data transfer. If then a new like address is provided for that comparison pair, the closed circuit path in the address comparison circuits 50 is broken, and the other selector relay in the parallel pair cannot close upon the application of a test signal. A specific address in the comparison register 60 for channel I may initially be unlike the address in the comparison register 64 for channel III, so that the selector relay I($a$) may be closed. If, however, upon the finish of a data transfer operation in channel III, the address in the comparison register 64 for channel III becomes the same as that in the other comparison register 60 in the series, the closed circuit through the pair of comparison registers 60, 64 will be broken. Although relay I($a$) will be held because of the self-hold feature, relay III($a$) will initially be opened. Upon the application of a test signal for channel III to relay III($a$), there is no grounded circuit, so that relay III($a$) cannot pick and be actuated. Therefore, the corresponding group of relays for channel III in the gating network of FIG. 5 cannot form a closed circuit and no output can be provided for channel III.

In this situation, therefore, the system waits until the address and the comparison register for channel I is changed to something different than that in channel III, at which time the selector relay III($a$) is closed and, assuming that the other addresses are unlike, a track available signal is provided in channel III. The same relationships may be seen to exist between channel I and channels IV and II, as well as among channels II, III and IV themselves. For each pair of addresses to arrive, the first address provided is permitted to use the available track, and the next succeeding data processing unit which seeks the same address must wait until the previous data transfer has been completed at that point in the memory. The result is that orderly changes in the data stored at each given location under these conditions is assured.

Different conditions obtain when two of the data processing units, 16–19 in FIG. 1, seek the same address simultaneously, or when more than two data processors seek the same address at substantially the same time. In such situations there is an interlock because neither selector relay associated with a given comparison pair can find a closed circuit path so as to become closed. Referring to FIG. 3, if like addresses are provided simultaneously in channels I and III, relays I(*a*) and III(*a*) in the comparison selector circuits 52 will remain open despite the application of test signals. To eliminate this interlock situation, the interlock control circuits of FIG. 6 both detect this situation and overcome it. The normally closed contacts for the selector relays which are involved are coupled in series between a test signal terminal and the pick coil of a control relay. As mentioned above, the control relay which is used is coupled to operate only one of the pair of selector relays, thus defining a priority between the selector relays. Again referring to the address comparison pair for channels I and II, in FIG. 6, it may be seen that when neither relay I(*a*) or III(*a*) is operated, the normally closed relay contacts I(*a*)′ and III(*a*)′ couple the test signal for channel I to actuate the pick coil 77 of control relay *k*I(*a*). As a result, the control relay contact *k*I(*a*) is closed, causing the hold coil 78 for the control relay *k*I(*a*) to be closed. This in turn closes a control relay contact *k*I(*a*) which is normally closed and which then couples the test signals for channel I to the hold coil 79 of the selector relay I(*a*). By this means the selector relay I(*a*) is operated, thus eliminating the interlock condition and giving channel I priority over channel III. Similarly, as may be seen in FIG. 6, channel I has priority over channels II and IV as well. Channel II has priority over both channels III and IV, and channel III has priority over channel IV. In each instance the operation of the interlock control circuit acts to close a selector relay in the gating circuits of FIG. 5, to provide a track availability signal.

If more than two data processing units seek the same address simultaneously, the interlock control circuits 54 award priority to the data processors in accordance with the order just discussed. If channels I, III and IV seek the same address, there would otherwise be an interlock between channels I and III, I and IV and also between channels III and IV. As may be seen in FIG. 6, however, and as in the above example, the interlock of selector relays I(*a*) and III(*a*) causes control relay *k*I(*a*) to be picked upon provision of test signals in channel I and to ultimately actuate selector relay I(*a*). Similarly, at the same time the interlock between selector relays I(*b*) and IV(*a*) results in the sequence in which the control relay *k*I(*b*) causes the operation of the selector relay I(*b*). Thus, an assigned priority has been adopted for channel I, and the track available signals may be provided when positioning is complete.

As between channels III and IV, however, the interlock condition also exists. Here relay III(*c*) and selector relay IV(*c*) (FIG. 3) provide a closed circuit path through the normally closed contacts III(*c*)′ and IV(*c*)′ (FIG. 6) to the control relay *k*III(*c*), which exercises a supervisory control over the selector relay III(*c*) of FIG. 3. The selector relay IV(*c*) remains open, but a track available signal is not provided in channel III because selector relay III(*a*) (see FIG. 5) remains open until such time as the address in channel I is changed to something different. When such change does occur, relay III(*a*) is closed, and the track available signal is provided in channel III.

The interlock control circuits 54 insure against duplicate use of the same address, no matter how many of the data processing units seek the same address, and no matter whether they seek it simultaneously or not. If, for example, the data processing unit for channel I seeks to return to the same address as channels III and IV during the time that channel III is operating at that address and channel IV has not yet operated, the track available signal will not be provided in channel I until such time as channels III and IV are finished at that address. In FIG. 3 for example, selector relays III(*a*) and IV(*a*) will then be closed but relays I(*a*) and I(*b*) will be open, and coupled to open circuits in the address comparison pair. In FIG. 6, the circuits including normally closed relay contacts III(*a*)′ and IV(*a*)′ will be open, so that the test signal for channel I cannot pass to operate the pick coils for control relays *k*I(*a*) and *k*I(*b*). Channel I must thus wait until the data processor for channel IV has completed operation at that address, following the data processor for channel III.

The system operates free of substantial limitations when an address is not provided, or when one or more of the data processors is turned off. In such instances an apparent address of all zeros may be provided. Inasmuch as many other thousands of address locations exist, this imposes no limitation. If the use of such an apparent address is to be avoided, however, a number which is not a legitimate address could readily be provided by the data processors during waiting and turn-off periods.

From the above description it is apparent that the system is so arranged that a number of separate data processors may utilize individual transducers in conjunction with a single data storage of high capacity, so as to gain access to stored information substantially independently of but not in conflict with the other data processors. In the usual case, when one unit seeks the same address as another, the addresses will not be provided simultaneously, and in such instances the system awards priority on the basis of time. In the special instances in which addresses are sought simultaneously, priority is awarded in accordance with an established order. It should be noted that the detection of the provision of simultaneous addresses, or the existance of an interlock condition, requires no complex or added circuitry. If addresses are provided at slightly varying times, an interlock may or may not result, but if the interlock does not result the interlock control circuitry does not come into play. On the other hand, the interlock control circuitry does exercise its supervisory function automatically any time an interlock condition exists.

A number of alternative constructions are made possible by arrangements in accordance with the invention. Thus, a number of data processors may be intercoupled with a number of random access memories. Each data processor may have a different transducer associated with each of more than one of the memories. In such systems the data processors can select from both memories and address locations.

It will also be recognized by those skilled in the art that other forms of random access memories having multiple-access units might also be used. Thus a rectangular array of bistable elements which is operable by different address units could have control circuitry coupled in a similar fashion to govern addressing of specific memory locations.

In other practical installations more than one access or transducer unit may be coupled to one data processor and to one random access memory. It is sometimes desirable, for example, to use two access units with a single data processor operating with a multiple-disc storage. Such a system permits greater utilization of the speed and capacity of both the data processor and the memory device. It will be recognized that devices in accordance with the present invention are inherently well suited for operating in this context as well as those already mentioned. Two of the transducers of FIG. 1, for example, may be used along with two address registers, one of the data processing units, and the priority control circuits. In such a configuration the data processor need only provide addresses and test signals on separate lines. The access units seek position and the control circuits indicate the availability of a track location as previously described. With this type of system, control of interlock may be achieved through an alternative circuit which operates one of the access units arbitrarily when the other is found not ready to operate. A normally closed contact in one channel, for example, may be used to permit operation of a selector relay in the other channel. This allows operation without a control relay, if desired.

While there has been described above and illustrated in the drawings by way of example an improved system for providing simultaneous use by more than one data processing unit of a single high capacity storage, it will be apparent that various alternate forms are feasible within the scope of the invention. Accordingly, any modifications, alterations, or equivalent arrangements falling within the scope of the appended claims are considered to be a part of the present invention.

What is claimed is:

1. Apparatus for synchronizing the flow of data between data processors and separate transducer units which operate individually with the data processors at selected addresses in a single multiple address information storage, the apparatus including in combination circuits responsive to the selected addresses and including switching elements, the switching elements being operable to provide closed circuit conditions for each pairing of unlike addresses, a gating network responsive to the closed circuit conditions for providing outputs indicating the availability of any transducer unit when all possible pairings of the address selected for that transducer unit with the other addresses cause closed circuit conditions indicating unlike addresses, and interlock control circuits responsive to the closed circuit conditions and coupled to operate the switching elements in accordance with a selected priority relationship when like addresses are provided simultaneously to cause an interlocking of the switching elements in the open circuit condition.

2. Apparatus for synchronizing the operation of individual data processors which use the same data storage, each of the data processors having a separate transducer unit which may be positioned at an address which conflicts with that of a different transducer unit, the apparatus including in combination comparison circuits responsive to the addresses from the data processors and including switching elements for pairing each address with the others, the switching elements indicating which of the pairs is unlike, gating circuits coupled to the switching elements to provide signals indicating a dissimilarity between a given address and the addresses for the other transducer units, and control circuits coupled to the switching elements and responsive to the state of the switching elements for operating selected individual elements in response to the occurrence of given like addresses.

3. Apparatus for synchronously operating a number of data processing systems each of which has a separate access device associated with a common information storage, including in combination circuits responsive to the addresses provided by the data processing systems for providing address comparison signals which indicate that pairs of addresses are unlike, gating circuits responsive to the address comparison signals for signalling when all possible pairings of a given address show it to be unlike the other addresses, and circuits responsive to the address comparison signals and coupled to the gating circuit for operating the gating circuits in accordance with a selected priority relationship when given pairs of addresses are concurrently provided.

4. Apparatus for operating a number of data processing systems, each of which provides address information, with a single information storage, each of the data processing systems including a separate transducer which is positioned in response to the addresses provided by the data processor and which provide signals indicating that positioning of the transducer is complete, the apparatus including in combination a number of comparator circuits responsive to the addresses from the data processing systems and comparing the address from each of the data processing systems with those from the other data processing systems in pairs, so that each possible unique pair of addresses from the different data processing systems is established, the paired comparison circuits operating to provide closed signal paths when the addresses of a pair are unlike, a number of circuits responsive to the individual transducer units and providing individual closed circuit paths coupled to the separate data processing systems when the transducers provide signals indicating that positioning is complete, a number of groups of selector circuit couplings, a different group being arranged with each data processing system, the selector circuits of each group being responsive to the signals representative of the comparison of a pair in the comparator circuit and being coupled serially together and to the selector circuit which is coupled to the associated transducer unit, so that when all of the selectors of the group are operated a closed circuit path indicating that the transducer is available for the exchange of information is provided to the associated data processing system, and a number of groups of interlock control circuits, one for each paired address combination and responsive to the condition of the selector circuits therefor, each interlock control circuit being coupled to provide an overriding operation of a selected one of the selector circuits when two of the selector circuits are unoperated in an interlocked manner due to the simultaneous arrival of like addresses from two of the data processing systems.

5. Apparatus responsive to addresses provided from a number of data processing systems which operate with a single storage, to provide signals indicating that the transducer unit for the data processing system may operate at a selected address without conflict with the other data processing systems, and including in combination circuits for comparing addresses by pairs, to provide a coupling to ground when addresses are unlike, groups of selector relays, each group being associated with a different data processing system and including a separate selector relay for each comparison pair involving an address comparison pair with which that group is affected, there being one different selector relay from each of two groups for each comparison pair, the selector relay being operated by the closed circuit path when the addresses being compared are unlike, the selector relays of each group being coupled together in series and coincident operation thereof indicating that the address desired by the data processing unit is unlike that of the other data processing units, and a group of priority control relays, each of the priority control relays being responsive to the state of a different pair of selector relays associated with a given comparison circuit, and each of the priority control relays being coupled to control the operation of a selected one of the selector relays so as to establish a priority relationship which compels operation of the chosen selector relay despite an interlock of the two relays of the pair due to simultaneous application of like addresses to the associated comparator circuitry.

6. A system for permitting a number of different data processors, each having a separate transducer, to operate with a single information storage, each of the data processors including means for providing addresses to the associated transducer, and each of the transducers including means for indicating that positioning is complete, the apparatus including in combination a different control circuit between each transducer and the associated processor for indicating that the transducer is available for use, the control circuit being responsive to the signal which indicates that positioning is complete and including circuits for separately comparing a newly provided address to the other than existing addresses and also means for signalling when the newly provided address is unlike the concurrently provided addresses, and a different interlock control circuit for each controlled circuit, the interlock control circuits being arranged to operate in response to like addresses provided simultaneously so as to establish selected closed signal paths in accordance with a predetermined priority when an interlock occurs.

7. A system for concurrently operating a number of different data processors which address separate transducers, which in turn provide track positioning completed signals, each of the transducers being associated with the same multi-track storage device, the system including in combination a different control circuit between each transducer and processor responsive to the transducer and processor for providing track availability signals, each different control circuit including comparator circuits for comparing a newly provided address from the data processor to the existing addresses from the other processors, and circuits providing track availability signals when all pairs of addresses are unlike, and the system also including a different interlock control circuit for each control circuit, the interlock control circuit responding to indications from the comparator circuits that a given pair of addresses is alike to operate the circuits providing track availability signals in accordance with a predetermined priority.

8. A system for giving an order of precedence to two address inputs provided randomly, the system including a comparator circuit for determining the similarity of a new address input to another address input, selection circuits responsive to the comparator circuit for indicating the existence of an operable condition when the new address input is unlike the other address input, and a control circuit for operating the selection circuits in a predetermined manner when two like new address inputs are provided simultaneously.

9. A system for giving an order of precedence to the use of two address inputs which are provided at random times and which may occur together, the system including comparator circuits responsive to the address inputs for comparing a newly provided address input against other address inputs then provided, a pair of relay selection circuits responsive to the comparator circuits and operated when the comparator circuits indicate that the address inputs are unlike, the selection circuits each including self-hold connections for maintaining operation until released, and an interlock control circuit responsive to the condition of operation of both the selection circuits and arranged to be operated thereby when both of the associated selection circuits indicate that the related address inputs are alike, the selection circuits being subject to an interlock condition when like address inputs are provided simultaneously, and the interlock control circuits being coupled to the self-hold mechanism of a selected one of the selection circuits for operating that selection circuit to establish a selected priority for like address inputs provided simultaneously.

10. A data processing system responsive to two storage address inputs which are provided at random times with respect to each other and which may be provided simultaneously, the system establishing an order of priority of use of the storage medium when the addresses are alike, and including comparator circuits responsive to each of the address inputs and coupled together to provide a closed circuit path when an address is different than the other address, a pair of relay selection circuits coupled in series to the comparator circuit and arranged to be operated individually upon the generation of a closed circuit path in the comparator circuits, the selector circuits being arranged to be separately operated and each including a self-hold connection and normally open and normally closed contacts, and relay control circuits responsive to the condition of the normally closed contacts of the selector relays and connected to the self-hold connection of one of the relays, and responding to like closed conditions of the normally closed contact for operating a selected self-hold mechanism of one of the selector relays for establishing a predetermined order of precedence of operation for the condition in which two like addresses are provided simultaneously.

11. A data processing system comprising a single multi-track information storage device, a number of data processing units, each providing address information for the selection of storage locations in the information storage, a number of data transducers, each mechanically movable under control of a different one of the data processors to different information address locations in the information storage, the data transducer units providing signals indicating that the positioning is complete, and a synchronization and control circuit coupled to receive the address information and the positioning complete signals and to provide signals to the data processing units indicating the availability of the transducer units for operation with the storage following positioning of the transducer unit at a selected address and without conflict with the operation of the other data processing units.

12. A data processing system comprising a single information storage, a number of information processing units each having a separately addressable access unit associated with the information storage, and circuits for coordinating the operation of the data processing systems so that no more than one operates at a given address location in the information storage at a time, the coordinating circuits including means for comparing the addresses from the data processing systems in pairs to determine whether a newly provided address is unlike the addresses provided by the other data processing units, and means responsive to simultaneous provision of two like addresses for selecting a particular data processing unit in accordance with a predetermined priority relationship for operation.

13. A data processing system comprising a multiple disc random access memory system having a number of information storage tracks on each disc, a number of information transducers movable with respect to the discs and operable under control of address signals to select particular tracks on particular discs, a number of data processing circuits providing address information, each of the data processing units being associated with the different one of the transducers, and circuits coupled to the transducers and to the data processing systems for signalling to the data processing units when the associated transducers may be operated without conflict with another transducer then at the same address, the circuits including means responsive to the addresses provided by the data processing units for indicating availability of tranducers on the basis of time priority, and means responsive to coincident arrival of two like addresses for selecting one of data processing units for operation in accordance with a predetermined priority.

14. A system for permitting more than one transducer to operate with a single information storage, including at least one data processor having means for providing addresses to the transducers and the transducers including means for indicating that positioning is complete, a different control circuit between each transducer and the processor for indicating that the transducer is available for use, the control circuit being responsive to the signal which indicates that positioning is complete and including circuits for comparing a newly provided address to the addresses provided for the other transducers and means for signalling when the newly provided address is unlike the concurrently provided addresses, and a different interlock control circuit for each control circuit, the interlock control circuit being arranged to operate in response to like addresses provided simultaneously so as to establish selected circuit conditions in accordance with a predetermined priority when an interlock occurs.

15. A system for giving an order of precedence to two memory address inputs provided randomly, the system including a circuit for indicating the similarity of a new address input to another address input, selection circuits responsive to the similarity indication for signalling when the new address input is unlike the other address input, and a control circuit for operating the selection circuits with a preselected priority when no selection circuit would otherwise provide a signal.

References Cited in the file of this patent

UNITED STATES PATENTS 1,927,556 Nelson ---------------- Sept. 19, 1933

UNITED STATES PATENT OFFICE
CERTIFICATE OF CORRECTION

Patent No. 3,158,844 November 24, 1964

Raymond R. Bowdle

It is hereby certified that error appears in the above numbered patent requiring correction and that the said Letters Patent should read as corrected below.

Column 6, line 60, for "point" read -- points --; column 7, line 32, for "are" read -- as --; line 61, for "(Ia)" read -- I(a) --; column 8, line 51, for "II" read -- III --; line 61, for "coupled" read -- couples --; column 9, line 57, after "transducer" insert -- unit --; same line 57, for "23", second occurrence, read -- 25 --; column 10, line 32, for "for" read -- from --; column 15, line 6, for "than" read -- then --; column 16, line 60, after "of" insert -- the --.

Signed and sealed this 1st day of June 1965.

(SEAL)

Attest:

ERNEST W. SWIDER
Attesting Officer

EDWARD J. BRENNER
Commissioner of Patents